US011342839B2

(12) United States Patent
Hsiao et al.

(10) Patent No.: US 11,342,839 B2
(45) Date of Patent: May 24, 2022

(54) POWER SUPPLY APPARATUS WITH OPERATION MODE ADJUSTMENT FUNCTION AND METHOD OF OPERATING THE SAME

(71) Applicant: Chicony Power Technology Co., Ltd., New Taipei (TW)

(72) Inventors: Cheng-Chang Hsiao, New Taipei (TW); Wen-Cheng Lu, New Taipei (TW); Yung-Hung Hsiao, New Taipei (TW)

(73) Assignee: CHICONY POWER TECHNOLOGY CO., LTD., New Taipei (TW)

( * ) Notice: Subject to any disclaimer, the term of this patent is extended or adjusted under 35 U.S.C. 154(b) by 199 days.

(21) Appl. No.: 16/815,235

(22) Filed: Mar. 11, 2020

(65) Prior Publication Data
US 2021/0194354 A1     Jun. 24, 2021

(30) Foreign Application Priority Data

Dec. 20, 2019   (TW) ................. 108146871

(51) Int. Cl.
*H02M 1/32*     (2007.01)
*H02M 1/42*     (2007.01)
(Continued)

(52) U.S. Cl.
CPC .......... *H02M 1/4225* (2013.01); *H02M 1/08* (2013.01); *H02M 1/32* (2013.01); *H02M 1/0009* (2021.05)

(58) Field of Classification Search
CPC ........ H02M 1/4225; H02M 1/32; H02M 1/08; H02M 1/0009; H02M 1/36; H02M 7/217
See application file for complete search history.

(56) References Cited

U.S. PATENT DOCUMENTS 7,276,883 B2   10/2007   Soldano
8,982,522 B2    3/2015   Duan et al.
(Continued)

FOREIGN PATENT DOCUMENTS

CN    101048716 A    10/2007
CN    101753006 A     6/2010
(Continued)

OTHER PUBLICATIONS

A. Vadde, S. Sachin and V. V. S. N. SitaramGupta, "Real implementation of synchronous boost converter with controller for power factor correction," 2017 IEEE Region 10 Symposium (TENSYMP), 2017, pp. 1-4 (Year: 2017).*
(Continued)

*Primary Examiner* — Kyle J Moody
*Assistant Examiner* — Jye-June Lee
(74) *Attorney, Agent, or Firm* — Muncy, Geissler, Olds & Lowe, P.C.

(57) ABSTRACT

A power supply apparatus includes a rectifier unit, a power factor correction circuit, and a control unit. The control unit correspondingly provides a reference voltage according to an amplitude of an input power source. When a voltage signal corresponding to an inductance current of an inductor of the power factor correction circuit is higher than the reference voltage, the control unit controls an energy release switch of the power factor correction circuit to be repeatedly switched on/off, and when the voltage signal is lower than the reference voltage, the control unit controls the energy release switch to be turned off.

18 Claims, 5 Drawing Sheets

(51) Int. Cl.
*H02M 1/08* (2006.01)
*H02M 1/00* (2006.01)

(56) References Cited

U.S. PATENT DOCUMENTS

| | | | |
|---|---|---|---|
| 9,450,436 B2 | 9/2016 | Carletti et al. | |
| 9,634,555 B2 | 4/2017 | De Rooij et al. | |
| 2006/0274468 A1* | 12/2006 | Phadke | H02M 7/125 361/93.1 |
| 2008/0116872 A1 | 5/2008 | Nakazono | |
| 2011/0006748 A1* | 1/2011 | Jang | H02M 1/4225 323/299 |
| 2015/0049528 A1 | 2/2015 | De Rooij et al. | |
| 2015/0162821 A1 | 6/2015 | Wu et al. | |
| 2016/0056702 A1* | 2/2016 | Halim | H02M 1/4225 363/74 |
| 2017/0302157 A1 | 10/2017 | Lin et al. | |

FOREIGN PATENT DOCUMENTS

| | | |
|---|---|---|
| CN | 204131388 U | 1/2015 |
| CN | 107834847 A | 3/2018 |
| CN | 108512431 A | 9/2018 |
| CN | 109756114 A | 5/2019 |
| CN | 110383661 A | 10/2019 |
| TW | 561673 B | 11/2003 |
| TW | 200703839 A | 1/2007 |
| TW | I310125 B | 5/2009 |
| TW | 200950290 A | 12/2009 |
| TW | 201027891 A | 7/2010 |
| TW | 201301734 A | 1/2013 |

OTHER PUBLICATIONS

Office Action issued in TW patent application No. 108146871 dated May 21, 2020.

* cited by examiner

POWER SUPPLY APPARATUS WITH OPERATION MODE ADJUSTMENT FUNCTION AND METHOD OF OPERATING THE SAME

BACKGROUND

Technical Field

The present disclosure relates to a power supply apparatus and a method of operating the same, and more particularly to a power supply apparatus capable of reducing power loss and increasing efficiency and a method of operating the same.

Description of Related Art

The statements in this section merely provide background information related to the present disclosure and do not necessarily constitute prior art.

In the basic circuit of the conversion power supply unit (PSU), due to the demand for high efficiency and high power, many circuits with improved performance have been developed, especially in the application of power factor correction circuits. In the current development of electronic circuits, more and more attention is paid to power consumption and efficiency. In order to further increase the efficiency of the conversion power supply unit, the power consumption of the power factor corrector must be further reduced.

On the other hand, multiple conversion power supply units are connected in parallel for high-power power supplies, and therefore the surge current generated at the moment of startup will affect the stability of the entire input power supply and the rules for safe use of input circuit breakers, so it's important to limit the surge current of the conversion power supply unit.

Especially in today's situation that different mains voltages are used in different countries, different input power sources will make the operation status of the conversion power supply units different. If the corresponding circuit design is not proposed in consideration of such a situation, the conversion power supply unit will cause unnecessary power loss when it operates under different input power conditions.

Therefore, how to design a power supply apparatus and a method of operating the same to correspondingly control the power factor correction circuit according to different input power sources to reduce the power consumption of the power factor correction circuit and also have the function of input current surge limitation is an important subject for the inventors.

SUMMARY

In order to solve the above-mentioned problem, a power supply apparatus is provided. The power supply apparatus includes a rectifier unit, a power factor correction circuit, and a control unit. The rectifier unit converts an input power source into a rectified power source. The power factor correction circuit has an energy storage switch enabling an inductor to store energy and an energy release switch enabling the inductor to release energy, and the power factor correction circuit converts the rectified power source into a DC power source. The control unit is coupled to the energy storage switch and the energy release switch. The control unit correspondingly provides a reference voltage according to an amplitude of the input power source. When a voltage signal corresponding to an inductance current of the inductor is higher than the reference voltage, the control unit controls the energy release switch to be repeatedly switched on/off. When the voltage signal is lower than the reference voltage, the control unit controls the energy release switch to be turned off.

In one embodiment, when the input power source increases, the control unit decreases the reference voltage; when the input power source decreases, the control unit increases the reference voltage.

In one embodiment, the control unit includes a current detection unit, a comparison unit, and a reference voltage generation unit. The current detection unit coupled to the power factor correction circuit and receives a current signal corresponding to the inductance current. The comparison unit is coupled to the current detection unit. The reference voltage generation unit is coupled to the comparison unit and receives a reference signal corresponding the amplitude of the input power source. The current detection unit converts the current signal into the voltage signal, and the reference voltage generation unit correspondingly generates the reference voltage according to the reference signal. The comparison unit compares the voltage signal with the reference voltage to provide a comparison signal so that the control unit controls the energy release switch to be repeatedly switched on/off or turned off according to the comparison signal.

In one embodiment, the control unit further includes a switch drive unit. The switch drive unit is coupled to the comparison unit and the energy release switch. The switch drive unit electrically isolates the comparison unit from the switch release switch, and selectively provides a work voltage to drive the energy release switch according to the comparison signal.

In one embodiment, the control unit further includes a hysteresis unit. The hysteresis unit is coupled to the reference voltage generation unit and the comparison unit. When the energy release switch is changed from repeatedly switched on/off state to turned off state or from turned off state to repeatedly switched on/off state by the comparison signal, the hysteresis unit adjusts the reference voltage from a first level to a second level during a hysteresis time period.

In one embodiment, a voltage value range of the reference voltage comprises a plurality of voltage values. When the control unit knows that the reference voltage is changed from a first voltage value to a second voltage value, the control unit controls to increase the reference voltage to a transient voltage value during a transient period, and the reference voltage is adjusted to the second voltage value after the transient period.

In one embodiment, the transient voltage value is a multiple of the second voltage value.

In one embodiment, when the energy release switch is repeatedly switched on/off, the control unit controls the power factor correction circuit to operate in a continuous conduction mode. When the energy release switch is turned off, the control unit controls the power factor correction circuit to operate in a discontinuous conduction mode.

In one embodiment, the power supply apparatus further includes a surge limitation unit. The surge limitation unit is coupled to a ground end of the power factor correction circuit and the rectifier unit. When the power factor correction circuit is activated and an output current of the power factor correction circuit flows through an energy storage capacitor connected to the power factor correction circuit to generate a surge, the surge limitation unit provides an resistance to limit a peak value of the surge, and when the control unit detects no surge, the control unit bypasses the resistance.

In one embodiment, the surge limitation unit includes a resistor and a switch. The resistor is coupled to the ground end. The switch is connected in parallel to the resistor and coupled to the control unit. When the surge exists, the control unit controls the switch to be turned off so that the resistor provides the resistance to limit the peak value of the surge. When the control unit detects that a voltage difference across the resistor is below a threshold voltage, the control unit controls the switch to be turned on to bypass the resistor.

In one embodiment, the input power source is between 90 volts and 264 volts.

In order to solve the above-mentioned problem, a method of operating a power supply apparatus is provided. The method includes steps of: converting an input power source into a rectified power source through a rectifier unit, converting the rectified power source into a DC power source through a power factor correction circuit, correspondingly providing a reference voltage according to an amplitude of the input power source, controlling to repeatedly switch on/off an energy release switch of the power factor correction circuit when a voltage signal corresponding to an inductor current of an inductor of the power factor correction circuit is higher than the reference voltage, and controlling to turn off the energy release switch when the voltage signal is lower than the reference voltage.

In one embodiment, decreasing the reference voltage when the input power source increases, and increasing the reference voltage when the input power source decreases.

In one embodiment, the method further includes steps of: receiving a current signal corresponding to the inductance current and converting the current signal into the voltage signal, receiving a reference signal corresponding to the amplitude of the input power source and correspondingly generating the reference voltage according to the reference signal, and providing a comparison signal by comparing the voltage signal with the reference voltage to control the energy release switch to be repeatedly switched on/off or turned off according to the comparison signal.

In one embodiment, the method further includes a step of: adjusting the reference voltage from a first level to a second level during a hysteresis time period when the energy release switch is changed from repeatedly switched on/off state to turned off state or from turned off state to repeatedly switched on/off state by the comparison signal.

In one embodiment, a voltage value range of the reference voltage comprises a plurality of voltage values. When the reference voltage is changed from a first voltage value to a second voltage value, the reference voltage is increased to a transient voltage value during a transient period, and the reference voltage is adjusted to the second voltage value after the transient period.

In one embodiment, the transient voltage value is a multiple of the second voltage value.

In one embodiment, controlling the power factor correction circuit to operate in a continuous conduction mode when the energy release switch is repeatedly switched on/off, and controlling the power factor correction circuit to operate in a discontinuous conduction mode when the energy release switch is turned off.

In one embodiment, when the power factor correction circuit is activated and an output current of the power factor correction circuit flows through an energy storage capacitor connected to the power factor correction circuit to generate a surge, a resistance is provided to limit a peak value of the surge, and when there is no surge, the resistance is bypassed.

In one embodiment, when the surge exists, the resistance is provided by a resistor to limit the peak value of the surge. When a voltage difference across the resistor is below a threshold voltage, the resistor is bypassed.

It is to be understood that both the foregoing general description and the following detailed description are exemplary, and are intended to provide further explanation of the present disclosure as claimed. Other advantages and features of the present disclosure will be apparent from the following description, drawings and claims.

BRIEF DESCRIPTION OF DRAWINGS

The present disclosure can be more fully understood by reading the following detailed description of the embodiment, with reference made to the accompanying drawings as follows.

DETAILED DESCRIPTION

Reference will now be made to the drawing figures to describe the present disclosure in detail. It will be understood that the drawing figures and exemplified embodiments of present disclosure are not limited to the details thereof.

Figure 1:
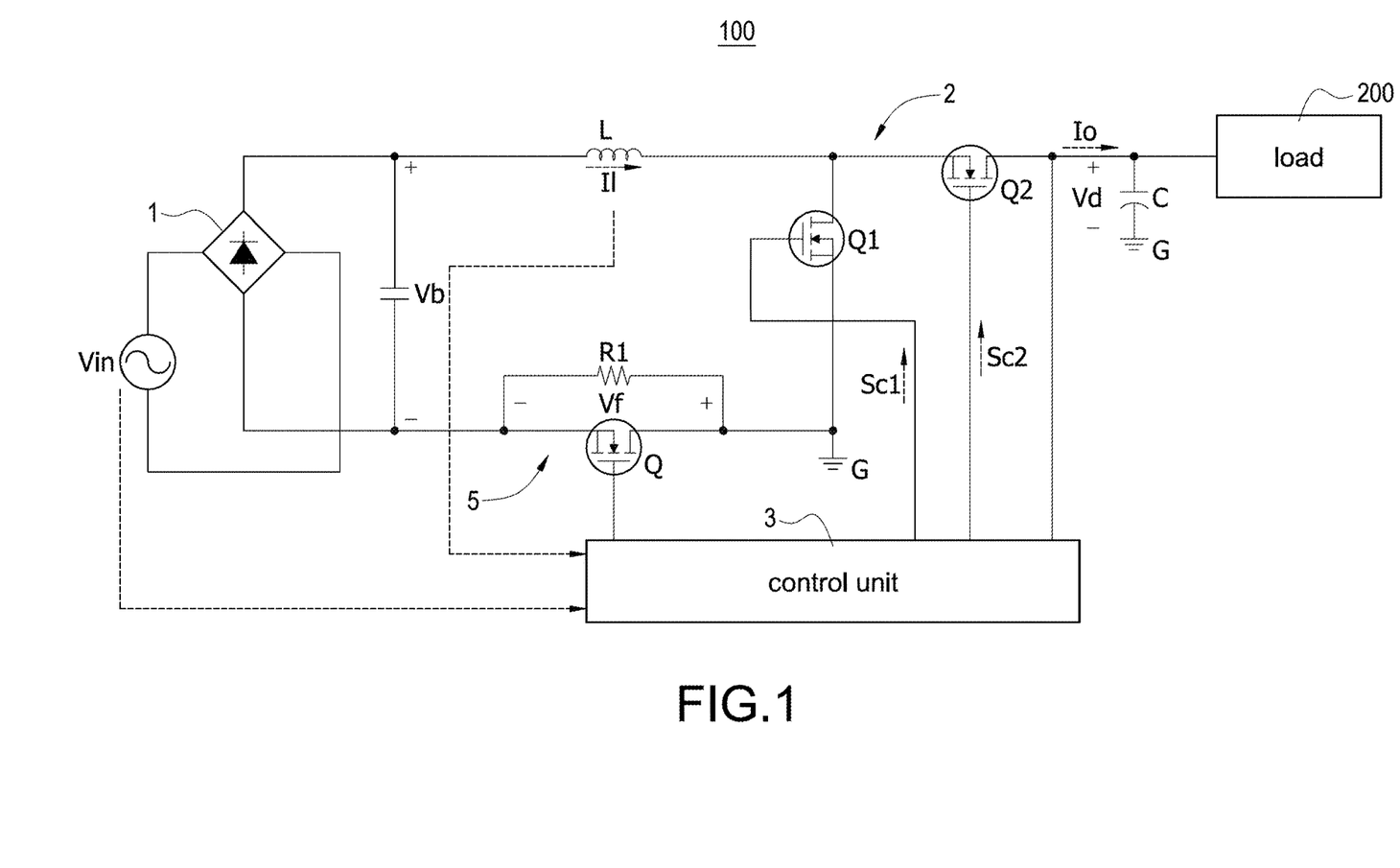
FIG. 1 is a block circuit diagram of a power supply apparatus according to the present disclosure.

Please refer to FIG. 1, which shows a block circuit diagram of a power supply apparatus according to the present disclosure. The power supply apparatus 100 is coupled to an energy storage capacitor C and converts an input power source Vin into a DC power source Vd to provide the DC power source Vd to the energy storage capacitor C. The load 200 is coupled to the energy storage capacitor C and stably operates by receiving the DC power source Vd on the energy storage capacitor C. The power supply apparatus 100 includes a rectifier unit 1, a power factor correction circuit 2, and a control unit 3. The power factor correction circuit 2 is coupled to the rectifier unit 1 and the control unit 3. The rectifier unit 1 converts the input power source Vin into a rectified power source Vb and provides the rectified power source Vb to the power factor correction circuit 2. As shown in FIG. 1, the power factor correction circuit 2 is a boost converter. The power factor correction circuit 2 includes an inductor L, an energy storage switch Q1, and an energy release switch Q2, and the inductor L is coupled to the rectifier unit 1, the energy storage switch Q1, and the energy release switch Q2. The energy storage switch Q1 is coupled to a ground end G and the energy release switch Q2 is coupled to the energy storage capacitor C. The control unit 3 is coupled to the DC power source Vd, the energy storage switch Q1, and the energy release switch Q2. The control unit 3 provides control signals Sc1, Sc2 to respectively control switching on/off of the energy storage switch Q1 and the energy release switch Q2 according to the feedback of the DC power source Vd, thereby stabling a voltage level of the DC power source Vd.

In one embodiment, the input power source Vin has a wide range of international universal voltage values (i.e., the voltage range can be between 90 volts and 264 volts). In one embodiment, the control unit 3 controls the energy storage switch Q1 and the energy release switch Q2 of the power factor correction circuit 2 by a PWM control.

Since the circuit structure of the conventional boost converter uses a diode at the position of the energy release switch Q2, the power consumed by the diode during forward turned-on operation is much larger than that of the switching component so the power consumption cannot be reduced when the power factor correction circuit 2 operates. The main purpose of the present disclosure is to replace the diode with an energy release switch Q2 and use the control unit 3 to control the energy release switch Q2 under the conditions of different input power sources Vin and output currents Io (load current) so that the power consumption of the diode under the condition of large current is improved, thereby increasing the overall efficiency of the power supply apparatus 100. Specifically, when the output current Io is higher (for example, the load 200 is a heavy load), the power factor correction circuit 2 operates in a continuous conduction mode (CCM). At this condition, since the inductor current Il of the inductor L will not reduce to zero, the control unit 3 controls the energy release switch Q2 to be constantly switched on/off (the resistance of the energy release switch Q2 is lower when the energy release switch Q2 is turned on and the power consumption is less than that of the diode) to reduce the power consumption of the power factor correction circuit 2 during operation (compared to using a diode). When the output current Io is lower (for example, the load 200 is a light load), the power factor correction circuit 2 operates in a discontinuous conduction mode (DCM). At this condition, since the inductor current Il of the inductor L will reduce to zero, the control unit 3 controls the energy release switch Q2 to be turned off. When the energy release switch Q2 is turned off and the inductor L releases energy to the energy storage capacitor C, the inductor current Il will be provided to the energy storage capacitor C through the path of the body diode of the energy release switch Q2. That is, the output current Io of the power factor correction circuit 2 flows to the energy storage capacitor C. When the output current Io is lower, the current through the body diode is smaller so the amount of power consumption of the power factor correction circuit 2 at this time is not large.

Since the inductor current Il of the power factor correction circuit 2 differs significantly when the input power source Vin is different, this current difference will cause the timing of switching of the power factor correction circuit 2 to change. Therefore, it is necessary to correct the timing of switching the operation mode according to the magnitude of the input power source Vin. Specifically, the control unit 3 is further coupled to the input power source Vin and the inductor L (due to the multiple manners available for coupling detection so it is indicated by dashed lines), and provides a reference voltage corresponding to the magnitude of the input power source Vin and provides a voltage signal according to the inductor current Il. That is, the magnitude of the reference voltage varies according to the magnitude of the input power source Vin, and the control unit 3 obtains the magnitude of the inductor current Il by detecting the voltage signal corresponding to the inductor current Il on the inductor L. When the voltage signal is higher than the reference voltage, the control unit 3 controls the energy release switch Q2 to be repeatedly switched on/off. When the voltage signal is lower than the reference voltage, the control unit 3 controls the energy release switch Q2 to be turned off. At this condition, the inductor current Il flows through the body diode. In one embodiment, the power factor correction circuit 2 is not limited to a circuit structure that can only use a boost converter, any circuit structure that can be used as the power factor correction circuit 2 and has a switching component that is repeatedly switched on/off in a continuous conduction mode and turns off in a discontinuous conduction mode, it can be used as the circuit structure of the power factor correction circuit 2 of the present disclosure.

Figure 2:
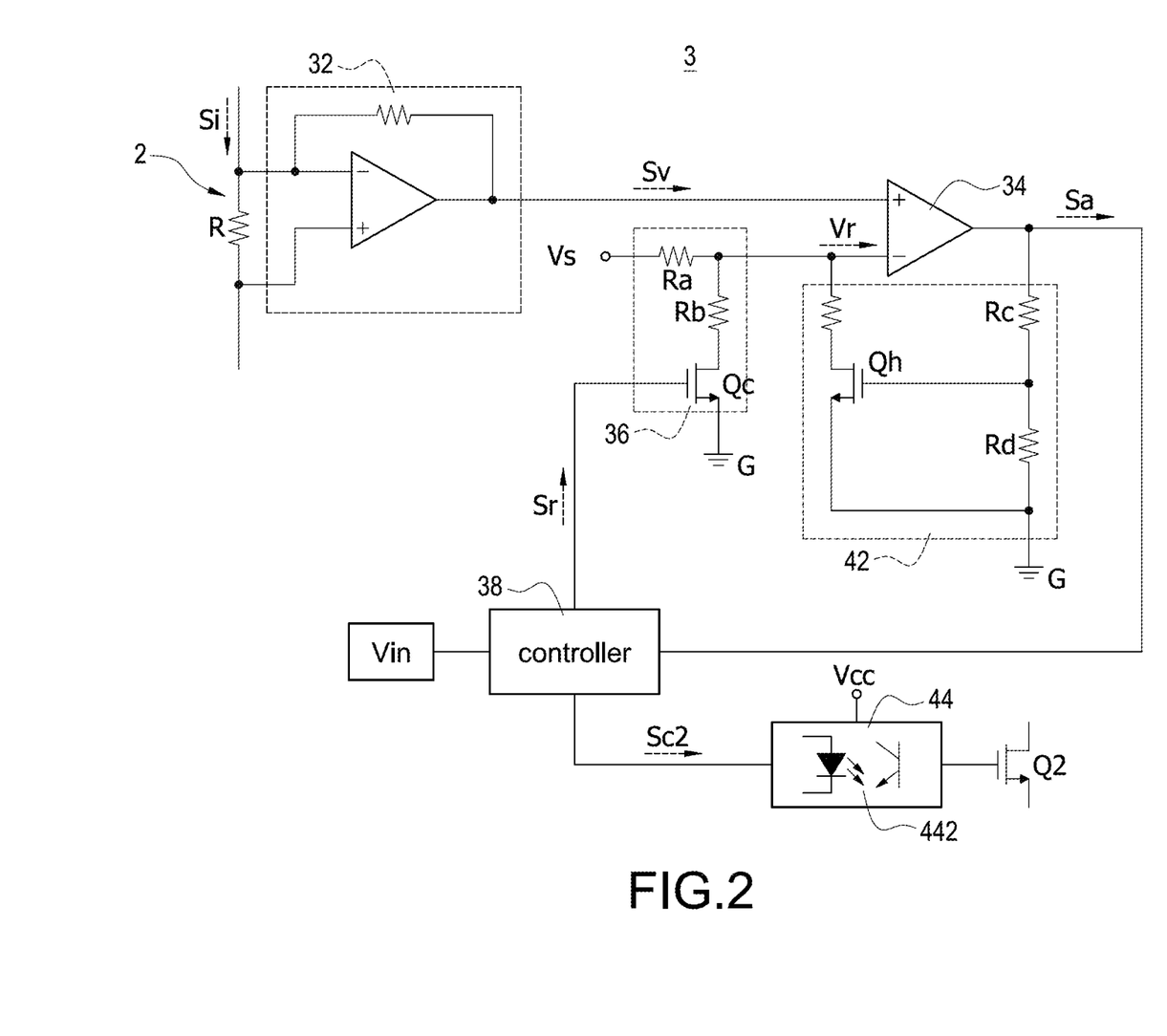
FIG. 2 is a block circuit diagram of a control unit according to the present disclosure.

Please refer to FIG. 2, which shows a block circuit diagram of a control unit according to the present disclosure, and also refer to FIG. 1. The control unit 3 includes a current detection unit 32, a comparison unit 34, a reference voltage generation unit 36, and a controller 38. The current detection unit 32 is coupled to the power factor correction circuit 2 and the comparison unit 34, receives a current signal Si corresponding to the inductor current Il, and generates a voltage signal Sv according to the current signal Si. In one embodiment, the coupling position of the current detection unit 32 to the power factor correction circuit 2 is not limited, and any position that can detect the magnitude of the inductor current Il should be included in the scope of this embodiment. The detection of the inductor current Il may be done by coupling a resistor R to a path through which the inductor current Il flows (for example, but not limited to a high voltage bus or a low voltage bus). When the inductor current Il flows through the resistor R, a current signal Si is generated across the resistor R (the current signal Si is presented in the form of a voltage value). Afterward, the current signal Si can pass through an amplifier (such as, but not limited to an error amplifier) inside the current detection unit 32 to amplify the current signal Si presented in the form of a voltage value and convert it into a voltage signal Sv. In one embodiment, the detection manner of the inductor current Il is not limited to using only the resistor R. Any detection manner that can detect the captured current signal Si should be included in the scope of this embodiment.

The controller 38 is coupled to the input power source Vin and the energy release switch Q2, and generates a reference signal Sr according to a voltage level of the input power source Vin. The voltage level of the input power source Vin can be known by detecting the input power source Vin or the DC power source Vd. The reference voltage generation unit 36 is coupled to the controller 38 and the comparison unit 34, and correspondingly generates a reference voltage Vr according to the reference signal Sr. When the input power source Vin increases, the controller 38 lowers the reference voltage Vr by adjusting the reference signal Sr, and when the input power source Vin decreases, the controller 38 raises the reference voltage Vr by adjusting the reference signal Sr.

The reference voltage generation unit 36 includes a first voltage division circuit Ra, Rb and a control switch Qc. The resistor Ra of the first voltage division circuit Ra, Rb is coupled to a voltage source Vs, a node between the resistor Ra and the resistor Rb is coupled to the comparison unit 34, and the resistor Rb is coupled to an input end of the control switch Qc. A control end of the control switch Qc is coupled to the controller 38, and an output end of the control switch Qc is coupled to the ground end G. When the input power source Vin is lower, the reference signal Sr is low-level so that the control switch Qc is turned off. At this condition, the reference voltage Vr received by the comparison unit 34 is the voltage value derived by subtracting the voltage difference across the resistor Ra from the voltage source Vs. When the input power source Vin is higher, the reference signal Sr is high-level so that the control switch Qc is turned on. At this condition, the reference voltage Vr received by the comparison unit 34 is a divided voltage of the voltage source Vs by using the resistor Ra and the resistor Rb. In one embodiment, the reference voltage generation unit 36 may be composed of various circuits, or may be directly integrated into the controller 38 to directly provide the reference voltage Vr. Therefore, the above-mentioned reference voltage generation unit 36 is only the simplest and cheapest implementation, and is not limited thereto.

The comparison unit 34 is coupled to the current detection unit 32, the reference voltage generation unit 36, and the controller 38, and provides a comparison signal Sa to the controller 38 according to the comparison between the voltage signal Sv and the reference voltage Vr. When the voltage signal Sv is greater than or equal to the reference voltage Vr, the controller 38 controls the energy release switch Q2 to be repeatedly switched on/off according to the comparison signal Sa. That is, the energy release switch Q2 is repeatedly turned on and off for switching. When the voltage signal Sv is less than the reference voltage Vr, the controller 38 controls to turn off the energy release switch Q2 according to the comparison signal Sa. That is, the energy release switch Q2 is turned off to stop switching.

Further, the reference voltage Vr can be adjusted through the reference signal Sr provided by the controller 38 so the voltage value range of the reference voltage Vr includes a plurality of voltage values, and the adjustment of the voltage value can be a linear adjustment or a segment adjustment (it depends on the resolution of the controller 38). When the reference voltage Vr is in a transient period, the control unit 3 controls the power factor correction circuit 2 with poor stability. In order to prevent this poor stability from affecting the correctness of the controller 38 in determining whether the energy release switch Q2 is switched or turned off, when the controller 38 knows that the reference voltage Vr is changed from the first voltage value to the second voltage value (i.e., the reference voltage Vr is adjusted (increased or decreased)), the controller 38 first controls to increase the reference voltage Vr to a transient voltage value during the transient period (i.e., the reference voltage Vr is first adjusted to the transient voltage value) and adjust the reference voltage Vr to the second voltage value after the transient period. The transient voltage value is based on the second voltage value and is a multiple of the second voltage value. For example, when the controller 38 knows that the reference voltage Vr is adjusted from 1.5 volts to 1 volt, the controller 38 first controls to adjust the reference voltage Vr to 1.2 volts (1.2 times of 1 volt) during the transient period, and after the transient period, the controller 38 then adjusts the reference voltage Vr to 1 volt.

The control unit 3 includes a hysteresis unit 42, and the hysteresis unit 42 is coupled to the reference voltage generation unit 36 and the comparison unit 34. Specifically, since the inductor current Il is a triangle wave current following the input power source Vin, the voltage signal Sv corresponding to the inductor current Il is also a triangle wave signal. When the voltage signal Sv is changed from greater than or equal to the reference voltage Vr to less than the reference voltage Vr, or when the voltage signal Sv is changed from less than the reference voltage Vr to greater than or equal to the reference voltage Vr (that is, when the operation mode is switched), the voltage signal Sv oscillates back and forth at the level of the reference voltage Vr and the operation mode is repeatedly switched so that the power supply apparatus 100 is exposed to a risk of failure due to the repeated operation mode switching. Therefore, the hysteresis unit 42 is used to create a hysteresis period after the operation mode is switched, which can prevent the power supply apparatus 100 from repeatedly switching the operation mode.

Further, when the comparison signal Sa enables the energy release switch Q2 to be changed from repeatedly switched on/off state to turned off state or from turned off state to repeatedly switched on/off state, the hysteresis unit 42 adjusts the reference voltage Vr from the first level to the second level during the hysteresis period (i.e., the reference voltage is increased or decreased) to prevent the power supply apparatus 100 from repeatedly switching the operation mode. When the voltage signal Sv is changed from greater than or equal to the reference voltage Vr to less than the reference voltage Vr, the hysteresis unit 42 increases the reference voltage Vr during the hysteresis period to prevent the triangle wave voltage signal Sv from touching the reference voltage Vr again. When the voltage signal Sv is changed from less than the reference voltage Vr to greater than or equal to the reference voltage Vr, the hysteresis unit 42 decreases the reference voltage Vr during the hysteresis period to prevent the triangle wave voltage signal Sv from touching the reference voltage Vr again.

In particular, a hysteresis comparator may be composed of the hysteresis unit 42 and the comparison unit 34. The hysteresis unit 42 includes a second voltage division circuit Rc, Rd and a hysteresis switch Qh. The resistor Rc of the second voltage division circuit Rc, Rd is coupled to an output end of the comparison unit 34, and a node between the resistor Rc and the resistor Rd is coupled to a control end of the hysteresis switch Qh. An input end of the hysteresis switch Qh is coupled to the reference voltage generation unit 36, and an output end of the hysteresis switch Qh is coupled to the ground end G. When the comparison signal Sa causes the energy release switch Q2 to be changed from repeatedly switched on/off state to turned off state or from turned off state to repeatedly switched on/off state, the hysteresis switch Qh is turned on to adjust the reference voltage Vr from the first level to the second level during the hysteresis period. In one embodiment, the hysteresis unit 42 may be composed of various circuits, or may be directly integrated into the controller 38 to directly provide a hysteresis function. Therefore, the above-mentioned hysteresis unit 42 is only the simplest and cheapest implementation, and is not limited thereto.

The control unit 3 further includes a switch drive unit 44, and the switch drive unit 44 is coupled to the controller 38 and the energy release switch Q2. The switch drive unit 44 includes a photo coupler 442, and the photo coupler 442 electrically isolates the comparison unit 34 from the energy release switch Q2. Specifically, since the control signals Sc1, Sc2 provided by the control unit 3 are light current signals, the control signals Sc1, Sc2 provided by the control unit 3 to the energy storage switch Q1 and the energy release switch Q2 must use the photo coupler 442 to perform electric isolation between the power factor correction circuit 2 and the control unit 3 to avoid the risk of accidental contact. Since the light current control signals Sc1,Sc2 usually cannot directly drive high-power switching components (especially in the case where the power supply apparatus 100 is applied to high-power application, such as but not limited to, 1 kW and above), when the controller 38 controls the energy release switch Q2 to be repeatedly switched on/off according to the comparison signal Sa and the control signal Sc2 is at a high level, the switch drive unit 44 provides a work voltage Vcc to drive and turn on the energy release switch Q2. When the controller 38 controls the energy release switch Q2 to be repeatedly switched on/off according to the comparison signal Sa and the control signal Sc2 is at a low level, or the controller 38 controls the energy release switch Q2 to be turned off according to the comparison signal Sa, the switch drive unit 44 does not provide the work voltage Vcc to drive the energy release switch Q2. In one embodiment, the switch drive unit 44 is not limited to only using the photo coupler 442 to drive the energy release switch Q2. For example, any component that can isolate and drive the energy release switch Q2 should be included in the scope of this embodiment.

Figure 3:
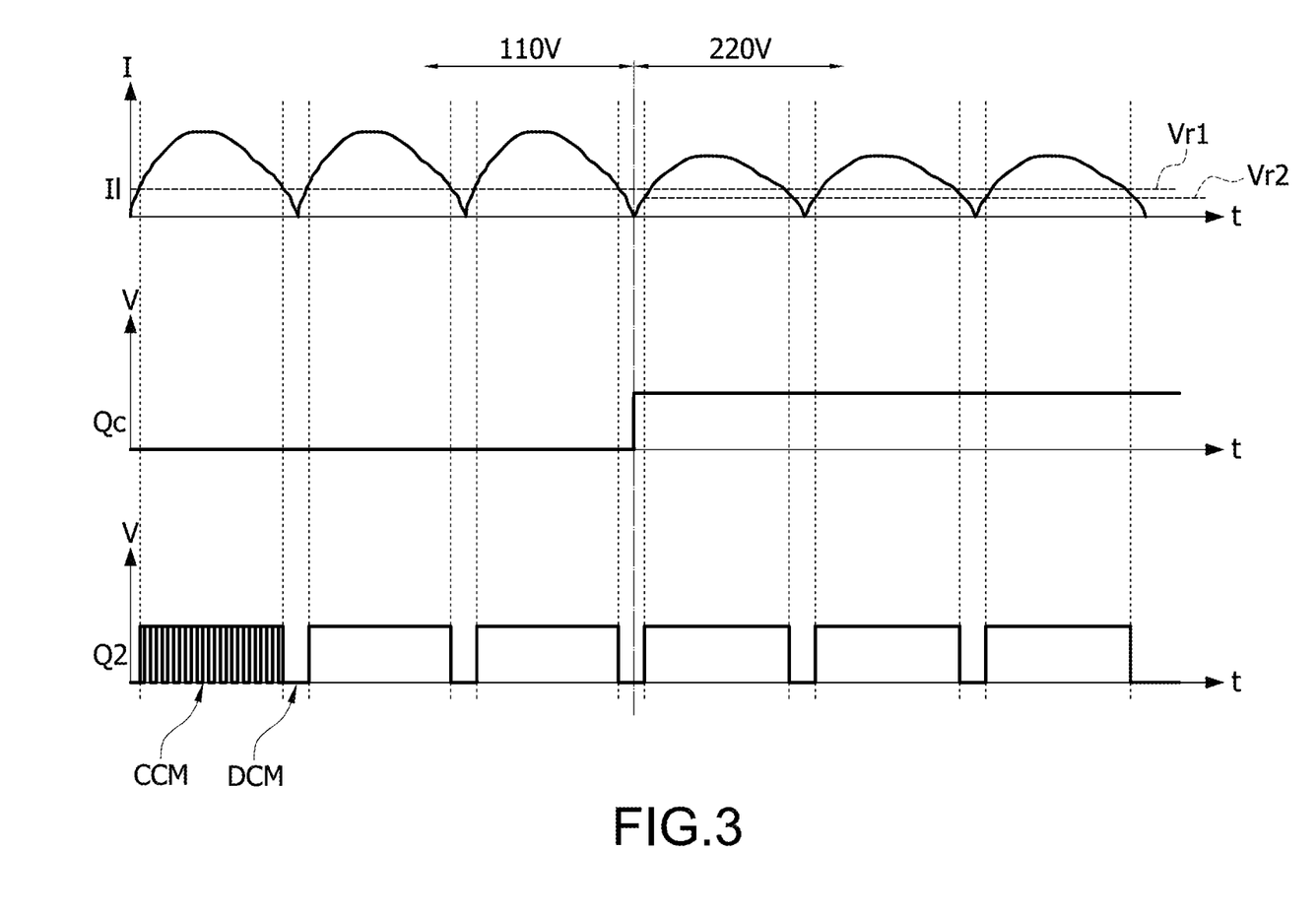
FIG. 3 is a waveform of the power supply apparatus according to the present disclosure.

Please refer to FIG. 3, which shows a waveform of the power supply apparatus according to the present disclosure, and also refer to FIG. 1 to FIG. 2. This waveform diagram uses the input power source Vin to be 110 volts and 220 volts as an example. When the input power source Vin is 110 volts, the inductor current Il is higher. In particular, the inductor current Il is a waveform following the input power source Vin, and the inductor current Il will follow sine waves to oscillate back and forth to form triangle waves, but for convenience of explanation, the triangle waves oscillating back and forth are represented by straight lines. The control unit 3 detects the magnitude of the input power source Vin and provides a low-level reference signal Sr. The low-level reference signal Sr turns off the control switch Qc so that the voltage difference across the resistor Ra is subtracted from the voltage source Vs to obtain a reference voltage Vr1 of 1.5 volts. When the voltage signal Sv is higher than the reference voltage Vr1 of 1.5 volts, the control unit 3 controls the energy release switch Q2 to be repeatedly switched on/off. Since the switching frequency is a high frequency, it has been switched multiple times during the continuous conduction mode (CCM) (as illustrated in the first square wave), and therefore the waveform of the power factor correction circuit 2 is shown as a square wave when operating in the continuous conduction mode. When the voltage signal Sv is lower than the reference voltage Vr1 of 1.5 volts, the control unit 3 controls the energy release switch Q2 to be turned off. When the input power source Vin is 220 volts, the inductor current Il is lower. The control unit 3 detects the magnitude of the input power source Vin and provides a high-level reference signal Sr. The high-level reference signal Sr turns on the control switch Qc so that the voltage source Vs generates a reference voltage Vr2 of 1 volt at the node between the resistor Ra and the resistor Rb through the divided voltage of the voltage source Vs by using the resistor Ra and the resistor Rb. The reference signal Sr provided by the controller 38 controls turning on or turning off the control switch Qc so that the resistance inside the reference voltage generation unit 36 is changed so that the reference voltage Vr with different voltage values can be obtained. The reference voltage Vr1 of 1.5 volts and the reference voltage Vr2 of 1 volt are merely exemplary, and it does not limit the control unit 3 to use only the reference voltage Vr of 1.5 volts and 1 volt as controlling the circuit. When the voltage signal Sv is higher than the reference voltage Vr2 of 1 volt, the control unit 3 controls the energy release switch Q2 to be repeatedly switched on/off. When the voltage signal Sv is lower than the reference voltage Vr2 of 1 volt, the control unit 3 controls the energy release switch Q2 to be turned off.

Also refer to FIG. 1, another object of the present disclosure is to reduce the power consumption when the power supply apparatus 100 is just activated, thereby improving the overall efficiency of the power factor correction circuit 2. Specifically, the power supply apparatus 100 further includes a surge limitation unit 5, and the surge limitation unit 5 is coupled to the ground end G of the power factor correction circuit 2 and the rectifier unit 1. The surge limitation unit 5 includes a resistor R1 and a switch Q, and the resistor R1 is coupled to the ground end G of the power factor correction circuit 2 and the rectifier unit 1. The switch Q is coupled in parallel to the resistor R1 and coupled to the control unit 3. In particular, the resistor R1 may be a negative temperature coefficient resistor or a positive temperature coefficient resistor. Specifically, when the power supply apparatus 100 is activated after receiving the input power source Vin, the energy storage capacitor C is short-circuited because the energy storage capacitor C has not yet stored energy. Therefore, the moment when the power supply apparatus 100 is activated and the output current Io flows through the energy storage capacitor C, a high current surge will be generated. The secondary object of the present disclosure is to suppress the peak value of the current surge generated by the energy storage capacitor C by using the resistance provided by the surge limitation unit 5 when the power supply apparatus 100 is just activated, thereby avoiding the failure or damage of the power supply apparatus 100 caused by the current surge.

Further, when the power factor correction circuit 2 is activated by receiving the rectified power source Vb, the control unit 3 controls the switch Q to be turned off. The output current Io flows through the energy storage capacitor C and the resistance R1 of the surge limitation unit 5, and the output current Io generates a current surge on the energy storage capacitor C. Since the resistor R1 can provide resistance, the resistance provided by the resistor R1 can limit the peak value of the current surge. Afterward, the control unit 3 continuously detects the voltage difference Vf across the resistor R1, and when the voltage difference Vf across the resistor R1 is lower than a threshold voltage, it means that the energy storage capacitor C has been charged to a voltage at which the power factor correction circuit 2 can normally operate (i.e., there is no current surge). At this condition, the control unit 3 turns on the switch Q to bypass the resistor R1, thereby reducing the power consumption when the power factor correction circuit 2 operates. At the same time, the control unit 3 also starts to provide control signals Sc1, Sc2 to control the power factor correction circuit 2 so that the power factor correction circuit 2 normally operates.

Figure 4A:
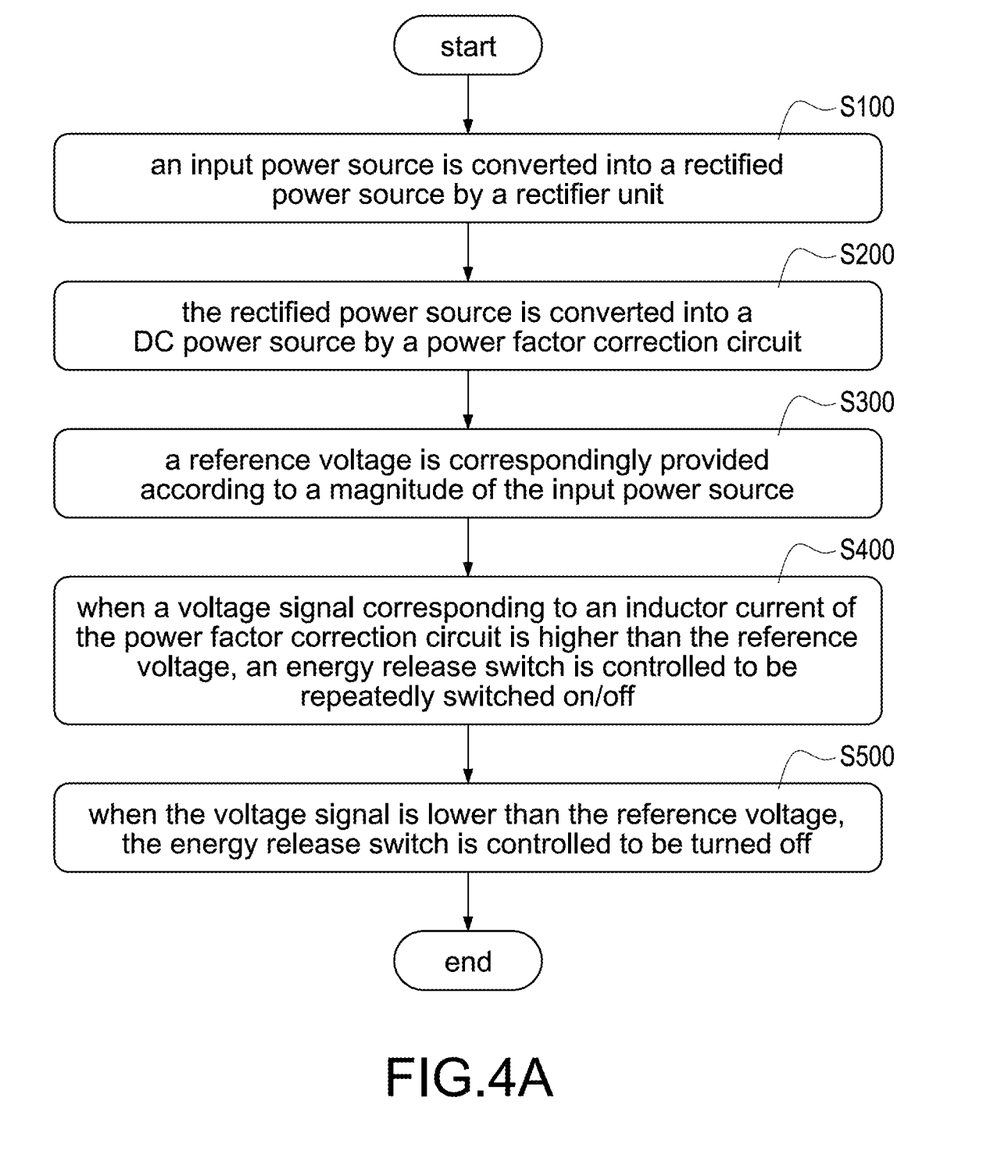
FIG. 4A is a flowchart of a method of operating a power factor correction circuit of the power supply apparatus according to the present disclosure.

Please refer to FIG. 4A, which shows a flowchart of a method of operating a power factor correction circuit of the power supply apparatus according to the present disclosure, and also refer to FIG. 1 to FIG. 3. The method includes steps as follows. First, the input power source is converted into the rectified power source by the rectifier unit (S100). The rectifier unit 1 of the power supply apparatus 100 converts the input power source Vin into a rectified power source Vb, and provides the rectified power source Vb to the power factor correction circuit 2. Afterward, the rectified power source is converted into the DC power source by the power factor correction circuit (S200). The control unit 3 controls the energy storage switch Q1 and the energy release switch Q2 in the power factor correction circuit 2 to be repeatedly switched on/off to convert the rectified power source Vb into the DC power source Vd through the power factor correction circuit 2.

Afterward, the reference voltage is correspondingly provided according to the magnitude of the input power source (S300). The controller 38 of the control unit 3 generates a reference signal Sr according to the magnitude of the input power source Vin, and correspondingly generates a reference voltage Vr according to the reference signal Sr so that the magnitude of the reference voltage Vr changes according to the magnitude of the input power source Vin. When the controller 38 knows that the reference voltage Vr is changed from the first voltage value to the second voltage value (i.e., the reference voltage Vr is adjusted (increased or decreased)), the controller 38 first controls to increase the reference voltage Vr to the transient voltage value during the transient period (i.e., the reference voltage Vr is first adjusted to the transient voltage value). After the transient period, the reference voltage Vr is adjusted to the second voltage value to prevent the correctness of switching on or turning off of the energy release switch Q2 from being affected by the poor stability of the power factor correction circuit 2 controlled by the control unit 3 when the reference voltage Vr changes in the transient period. The transient voltage value is based on the second voltage value and is a multiple of the second voltage value. When the input power source Vin increases, the controller 38 decreases the reference voltage Vr by adjusting the reference signal Sr, and when the input power source Vin decreases, the controller 38 increases the reference voltage Vr by adjusting the reference signal Sr.

Afterward, when the voltage signal corresponding to the inductor current of the power factor correction circuit is higher than the reference voltage, the energy release switch is controlled to be repeatedly switched on/off (S400). The current detection unit 32 of the control unit 3 receives a current signal Si corresponding to the inductor current Il, and generates a voltage signal Sv according to the current signal Si. The comparison unit 34 of the control unit 3 provides a comparison signal Sa to the controller 38 by comparing the voltage signal Sv with the reference voltage Vr so that the controller 38 controls the energy release switch Q2 to be repeatedly switched on/off or turned off according to the comparison signal Sa. When the voltage signal Sv is higher than the reference voltage Vr corresponding to the magnitude of the input power source Vin, it means that the inductor current Il at this time is higher (heavy load). The control unit 3 controls the energy release switch Q2 to be repeatedly switched on/off so that the power factor correction circuit 2 operates in the continuous conduction mode. When the comparison signal Sa enables the energy release switch Q2 to be changed from repeatedly switched on/off state to turned off state or from turned off state to repeatedly switched on/off state, the hysteresis unit 42 adjusts the reference voltage Vr from the first level to the second level (i.e., the reference voltage Vr is increased or decreased) to prevent the power supply apparatus 100 from repeatedly switching the operation mode. Finally, when the voltage signal is lower than the reference voltage, the energy release switch is controlled to be turned off (S500). When the voltage signal Sv is lower than the reference voltage Vr corresponding to the magnitude of the input power source Vin, it means that the inductor current Il at this time is lower (light load). The control unit 3 controls the energy release switch Q2 to be turned off so that the power factor correction circuit 2 operates in a discontinuous conduction mode.

Figure 4B:
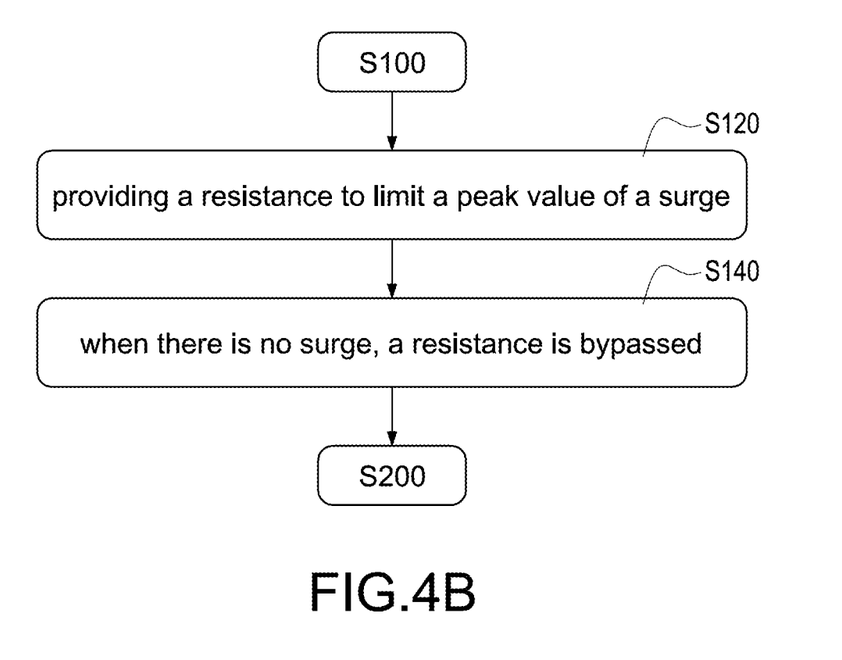
FIG. 4B is a flowchart of a method of activating the power supply apparatus according to the present disclosure.

Please refer to FIG. 4B, which shows a flowchart of a method of activating the power supply apparatus according to the present disclosure, and also refer to FIG. 1 to FIG. 4A. After the step (S100), when the power factor correction circuit 2 receives the rectified power source Vb and is ready to be activated, the output current Io flowing through the energy storage capacitor C will generate a higher current surge. Therefore, the operation method after the step (100) first includes providing a resistance to limit a peak value of the surge (S120). The surge limitation unit 5 is coupled to the ground end G of the power factor correction circuit 2 and the rectifier unit 1, and includes a resistor R1 and a switch Q. The resistor R1 is coupled to the ground end G of the power factor correction circuit 2 and the rectifier unit 1. The switch Q is coupled in parallel to the resistor R1 and is coupled to the control unit 3. When the power factor correction circuit 2 is activated by receiving the rectified power source Vb, the control unit 3 controls the switch Q to be turned off. The output current Io flows through the energy storage capacitor C and the resistor R1 of the surge limitation unit 5 to limit the peak value of the surge by a resistance provided by the resistor R1. Afterward, when there is no current surge, the resistance is bypassed (S140). The control unit 3 continuously detects the voltage difference Vf across the resistor R1, and when the voltage difference Vf across the resistor R1 is lower than the threshold voltage, it means that the energy storage capacitor C has been charged to a voltage at which the power factor correction circuit 2 can normally operate (i.e., there is no current surge). At this condition, the control unit 3 turns on the switch Q to bypass the resistor R1, thereby reducing the power consumption when the power factor correction circuit 2 operates. Finally, it returns to the step (S200).

In summary, the main advantages and effects of the embodiments of the present disclosure are that the power supply apparatus of the present disclosure replaces the diode of the conventional power factor correction circuit with an energy release switch. Also, the control unit is used to control the energy release switch under different input power source and output current (load current) conditions to reduce the power consumption of the diode under the condition of large current, thereby increasing the overall efficiency of the power supply apparatus.

Although the present disclosure has been described with reference to the preferred embodiment thereof, it will be understood that the present disclosure is not limited to the details thereof. Various substitutions and modifications have been suggested in the foregoing description, and others will occur to those of ordinary skill in the art. Therefore, all such substitutions and modifications are intended to be embraced within the scope of the present disclosure as defined in the appended claims.

What is claimed is:

1. A power supply apparatus, comprising:
   a rectifier unit configured to convert an input power source into a rectified power source,
   a power factor correction circuit having an energy storage switch enabling an inductor to store energy and an energy release switch enabling the inductor to release energy, and the power factor correction circuit configured to convert the rectified power source into a DC power source, and
   a control unit coupled to the energy storage switch and the energy release switch,
   wherein the control unit is configured to correspondingly provide a reference voltage according to an amplitude of the input power source; when a voltage signal corresponding to an inductance current of the inductor is higher than the reference voltage, the control unit is configured to control the energy release switch to be repeatedly switched on/off; when the voltage signal is lower than the reference voltage, the control unit is configured to control the energy release switch to be turned off, and
   wherein a voltage value range of the reference voltage comprises a plurality of voltage values; when the control unit knows that the reference voltage is changed from a first voltage value to a second voltage value, the control unit is configured to increase the reference voltage to a transient voltage value during a transient period, and the reference voltage is adjusted to the second voltage value after the transient period.

2. The power supply apparatus in claim 1, wherein when the input power source increases, the control unit is configured to decrease the reference voltage; when the input power source decreases, the control unit is configured to increase the reference voltage.

3. The power supply apparatus in claim 1, wherein the control unit comprises:
a current detection unit coupled to the power factor correction circuit and configured to receive a current signal corresponding to the inductance current,
a comparison unit coupled to the current detection unit, and
a reference voltage generation unit coupled to the comparison unit and configured to receive a reference signal corresponding the amplitude of the input power source,
wherein the current detection unit is configured to convert the current signal into the voltage signal, and the reference voltage generation unit is correspondingly configured to generate the reference voltage according to the reference signal; the comparison unit is configured to compare the voltage signal with the reference voltage to provide a comparison signal so that the control unit is configured to control the energy release switch to be repeatedly switched on/off or turned off according to the comparison signal.

4. The power supply apparatus in claim 3, wherein the control unit further comprises:
a switch drive unit coupled to the comparison unit and the energy release switch,
wherein the switch drive unit is configured to electrically isolate the comparison unit from the energy release switch, and selectively provide a work voltage to drive the energy release switch according to the comparison signal.

5. The power supply apparatus in claim 3, wherein the control unit further comprises:
a hysteresis unit coupled to the reference voltage generation unit and the comparison unit,
wherein when the energy release switch is changed from repeatedly switched on/off state to turned off state or from turned off state to repeatedly switched on/off state by the comparison signal, the hysteresis unit is configured to adjust the reference voltage from a first level to a second level during a hysteresis time period.

6. The power supply apparatus in claim 1, wherein the transient voltage value is a multiple of the second voltage value.

7. The power supply apparatus in claim 1, wherein when the energy release switch is repeatedly switched on/off, the control unit is configured to control the power factor correction circuit to operate in a continuous conduction mode; when the energy release switch is turned off, the control unit is configured to control the power factor correction circuit to operate in a discontinuous conduction mode.

8. The power supply apparatus in claim 1, further comprising:
a surge limitation unit coupled to a ground end of the power factor correction circuit and the rectifier unit,
wherein when the power factor correction circuit is activated and an output current of the power factor correction circuit flows through an energy storage capacitor connected to the power factor correction circuit to generate a surge, the surge limitation unit is configured to provide a resistance to limit a peak value of the surge, and when the control unit detects no surge, the control unit is configured to bypass the resistance.

9. The power supply apparatus in claim 8, wherein the surge limitation unit comprises:
a resistor coupled to the ground end, and
a switch connected in parallel to the resistor and coupled to the control unit,
wherein when the surge exists, the control unit is configured to control the switch to be turned off so that the resistor is configured to provide the resistance to limit the peak value of the surge; when the control unit detects that a voltage difference across the resistor is below a threshold voltage, the control unit is configured to control the switch to be turned on to bypass the resistor.

10. The power supply apparatus in claim 1, wherein the input power source is between 90 volts and 264 volts.

11. A method of operating a power supply apparatus, comprising steps of:
converting an input power source into a rectified power source through a rectifier unit,
converting the rectified power source into a DC power source through a power factor correction circuit,
correspondingly providing a reference voltage according to an amplitude of the input power source,
controlling to repeatedly switch on/off an energy release switch of the power factor correction circuit when a voltage signal corresponding to an inductor current of an inductor of the power factor correction circuit is higher than the reference voltage, and
controlling to turn off the energy release switch when the voltage signal is lower than the reference voltage,
wherein a voltage value range of the reference voltage comprises a plurality of voltage values; when the reference voltage is changed from a first voltage value to a second voltage value, the reference voltage is increased to a transient voltage value during a transient period, and the reference voltage is adjusted to the second voltage value after the transient period.

12. The method of operating the power supply apparatus in claim 11, wherein
decreasing the reference voltage when the input power source increases, and
increasing the reference voltage when the input power source decreases.

13. The method of operating the power supply apparatus in claim 11, further comprising:
receiving a current signal corresponding to the inductance current and converting the current signal into the voltage signal,
receiving a reference signal corresponding to the amplitude of the input power source and correspondingly generating the reference voltage according to the reference signal, and
providing a comparison signal by comparing the voltage signal with the reference voltage to control the energy release switch to be repeatedly switched on/off or turned off according to the comparison signal.

14. The method of operating the power supply apparatus in claim 13, further comprising a step of:
adjusting the reference voltage from a first level to a second level during a hysteresis time period when the energy release switch is changed from repeatedly switched on/off state to turned off state or from turned off state to repeatedly switched on/off state by the comparison signal.

15. The method of operating the power supply apparatus in claim 11, wherein the transient voltage value is a multiple of the second voltage value.

16. The method of operating the power supply apparatus in claim 11, wherein
- controlling the power factor correction circuit to operate in a continuous conduction mode when the energy release switch is repeatedly switched on/off, and
- controlling the power factor correction circuit to operate in a discontinuous conduction mode when the energy release switch is turned off.

17. The method of operating the power supply apparatus in claim 11, wherein when the power factor correction circuit is activated and an output current of the power factor correction circuit flows through an energy storage capacitor connected to the power factor correction circuit to generate a surge, a resistance is provided to limit a peak value of the surge, and when there is no surge, the resistance is bypassed.

18. The method of operating the power supply apparatus in claim 17, wherein when the surge exists, the resistance is provided by a resistor to limit the peak value of the surge; when a voltage difference across the resistor is below a threshold voltage, the resistor is bypassed.

* * * * *